United States Patent [19]
Bird

[11] Patent Number: 5,564,324
[45] Date of Patent: Oct. 15, 1996

[54] VARIABLE THICKNESS LINEAR SAWS

[75] Inventor: Warren M. Bird, Berkeley, Calif.

[73] Assignee: California Saw and Knife Works, San Francisco, Calif.

[21] Appl. No.: 221,738

[22] Filed: Apr. 1, 1994

[51] Int. Cl.$^6$ .................................................. B26D 1/46
[52] U.S. Cl. .................... 83/661; 83/838; 83/697
[58] Field of Search .......................... 83/661, 835, 838, 83/697; 30/346, 349, 357

[56] References Cited

U.S. PATENT DOCUMENTS

| | | | |
|---|---|---|---|
| 2,355,124 | 8/1944 | Testo | 83/661 X |
| 4,345,499 | 8/1982 | Ross | 83/835 |
| 4,979,417 | 12/1990 | Bird . | |
| 5,001,957 | 3/1991 | Steckler | 83/661 X |

FOREIGN PATENT DOCUMENTS

| | | | |
|---|---|---|---|
| 1126700 | 7/1956 | France | 83/835 |
| 1435429 | 11/1988 | U.S.S.R. | 83/661 |

OTHER PUBLICATIONS

Hutton, S. G. et al., "Operating stresses in bandsaw blades and their effect on fatigue life," 1991, *Forest Products J.* 41(7/8):12–20, Jul./Aug. 1991.

Primary Examiner—Rinaldi I. Rada
Assistant Examiner—Boyer Ashley
Attorney, Agent, or Firm—Townsend and Townsend and Crew LLP

[57] ABSTRACT

A variable thickness linear saw design is proposed for enabling maximum reduction of the thickness of the kerf associated with such saws. Typically, such saws have cutting teeth mounted on the leading edge of a supporting plate. In the improvement of this saw, this supporting plate is given two discrete thicknesses relative to the kerf. A first and narrow thickness (relative to the kerf) longitudinal segment is used parallel to and adjacent the supported teeth. This first and narrow thickness longitudinally extending segment only occupies a fraction of less than half and preferably about 20% of the full width of the saw behind the supported teeth. A second and expanded thickness (relative to the kerf) longitudinal segment is used for the remaining width of the saw. The reduced thickness of the narrow tooth supporting section of the saw forms in the case of the linear saws a preferred exit path for sawdust, this preferred exit path being immediately adjacent and behind the supported teeth of the saw. A variable thickness linear saw of the proposed design exhibits greater lateral stiffness than does a conventional linear saw of uniform thickness. Further, the saw can be subject to greater tension to resist deflection. Finally, the narrow linear segment supporting the teeth can be shown to have superior resistance to gullet cracking when incorporated to band saw construction. Tension increases in such band saws up to approximately 40% for a given width of kerf can result with consequent improved resistance to transverse forces and improved linearity of the kerf.

8 Claims, 4 Drawing Sheets

VARIABLE THICKNESS LINEAR SAWS

This invention relates to variable thickness linear saws. More specifically, both a reciprocating saw and a revolving band saw construction with a variable thickness backing is set forth.

BACKGROUND OF THE INVENTION

In my U.S. Pat. No. 4,979,417 issued Dec. 25, 1990 entitled Rotating Saw Blade Having Improved Critical Vibrational Speed, a rotating saw is set forth having a variable thickness circumferential sections. These sections include a relatively thick integral rotating hub which contributes to the support of the saw. This rotating hub does not enter into the sawed kerf made by the saw in cut lumber.

Passing into the produced kerf of my Bird '417 saw construction are two variable thickness circumferential saw portions. The first and inner portion is a relatively thick and relatively narrow circumferential saw portion joined to the hub at its smallest radius and protruding outward toward the saw teeth. The second is a relatively thinner and larger circumferential saw portion joined to the thick and small circumferential saw portion at its inner radius and supporting the saw teeth at its outer radius. The supported teeth are wider than both circumferential sections—but not necessarily wider than the central hub.

The design of this saw is principally tailored to counteract transverse or lateral forces and hoop stresses which act to produce kerf degrading vibrational modes occurring when a rotating saw cuts lumber and produces a kerf. Specifically, in the attempt to produce ever smaller saw kerfs (and waste ever smaller quantities of processed lumber in the form of sawdust) saws have been constructed of thinner dimensions. The design of my '417 Patent enables optimum metal distribution through out a rotating saw to enable optimum resistance to vibrational modes which degrade and rendered wider and less even the intended saw kerf.

As distinguished from my earlier '417 Patent, the present invention relates to linear saws. Such linear saws present considerations that are quite different from those encountered in circular saws. First, such saws are supported at both ends. Typically, the entire length of the saw is under tension. The greater the tension, the greater the ability of the saw to resist transverse forces from the side of the saw (normal to the plane of the kerf).

Secondly, the entire length of the saw between the supports at opposite ends of the saw passes through the kerf of the cut lumber. There is no central hub. Further, vibration in a circumferential (circular) mode is obviously not a consideration. The waves do not propagate in a circular path about the center of the saw. No portion of the saw can be thicker than the saw kerf, as can be the case for the central hub of a circular saw. There is no part of a linear saw analogous to the central hub of a circular saw.

Thirdly, continuous band saws and reciprocating saws, in common with circular saws, do not retain within the tooth gullets all of the material which has been cut. Some of this material (e.g., "sawdust" in wood cutting or "chips" in metal cutting) escapes from the gullets before the saw tooth gullets are able to exit the workpiece and discharge the contents of the gullets.

This effect is more pronounced in linear saws because band and reciprocating saws are most often selected for greater widths of cut. Because of the greater distance which each tooth must travel while cutting, a greater volume of sawdust or chips is generated by each tooth, and a greater volume of that material escapes the gullet into the zone between the sides of the tooth and the surface of the cut. Because of these required sawdust ejection considerations, the thickness of bands supporting the teeth is linear saws is often only slightly more than half of the width of the kerf itself.

Finally, and especially with respect to band saws, so-called gullet cracking—cracking of the saw at the leading edge in the arcuate portion immediate below or above a supported tooth—accompanies fatigue failure of the saw. Such fatigue failure is accentuated in band saws by stress reversal as the saw passes under tension around wheels reversing the path of the saw. This is especially pronounced in newer "high strain" band saws where the saw is under the maximum tension to maintain a linear kerf against the forces of transverse deflection.

It should be noted that in linear saws, transverse deflection of one kind or another is to be anticipated. Such transverse deflection most frequently occurs when pieces of already severed material find their way into the interval between the kerf and saw or when material of varying density is encountered. Other forces, such as unwanted deflections and vibrations can subject linear saws to transverse forces. It is to be understood that the resistance to such transverse forces is one of the main limiting factors in linear saw design.

In the following description, reference to the particular portions of linear saws will be required. Viewing such a saw from the side with the teeth disposed in a vertical line at the left will be presumed. Reference will be made to the saw backing. This is the metal behind the teeth that support the teeth in cutting. It will be appreciated that this metal backing must of necessity pass through the kerf created by the saw.

The term "thickness" will be utilized. This will refer to the dimension of the saw through the teeth or backing in a direction normal to the major plane of the saw. Further, the term "longitudinal" is utilized. This refers to vertical segments of the saw backing taken parallel to the line of the saw teeth. Additionally, the term "width" is used. This refers to the dimension D (see FIG. 1) of the saw in the cutting direction. This width dimension is taken from the cutting teeth to end of the saw backing. The term "depth" is usually reserved for the thickness of the material being cut or the distance along which the saw is cutting (also known as "cutting height").

SUMMARY OF THE INVENTION

A variable thickness linear saw design is proposed for enabling maximum reduction of the kerf associated with such saws. Typically, such saws have cutting teeth mounted on the leading edge of a supporting plate. In the improvement of this saw, this supporting plate is given two discrete thicknesses relative to the kerf. A first and narrow thickness (relative to the kerf) longitudinally extending strip is used parallel to and adjacent the supported teeth. This first and narrow thickness longitudinally extending strip only occupies a fraction of less than half and preferably about 20% of the full width of the saw behind the supported teeth. A second and expanded thickness (relative to the kerf) longitudinally extending strip is used for the remaining longitudinal depth of the saw. The reduced thickness of the narrow tooth supporting section of the saw forms in the case of the linear saws a preferred exit path for sawdust, this preferred exit path being immediately adjacent and behind the supported teeth of the saw. This preferred sawdust exit path essentially restricts the bulk of sawdust ejection to its confines and enables the remaining longitudinal sector of the saw backing to be expanded in thickness relative to the kerf. There results a linear saw construction which can tolerate higher tension for any produced width of kerf. Further, the narrow tooth supporting longitudinal segment comes under maximum tensile force when the saw is subjected to linear tension, assuring that this portion of the saw remains under maximum tension with resultant linearity during the cutting process. Finally, the narrow linear segment supporting the teeth can be shown to have superior resistance to gullet cracking when incorporated to band saw construction. Tension increases in such band saws up to approximately 40% for a given width of kerf can be achieved with consequent improved resistance to transverse forces and improved linearity of the kerf.

DESCRIPTION OF THE PREFERRED EMBODIMENT

Figure 1:
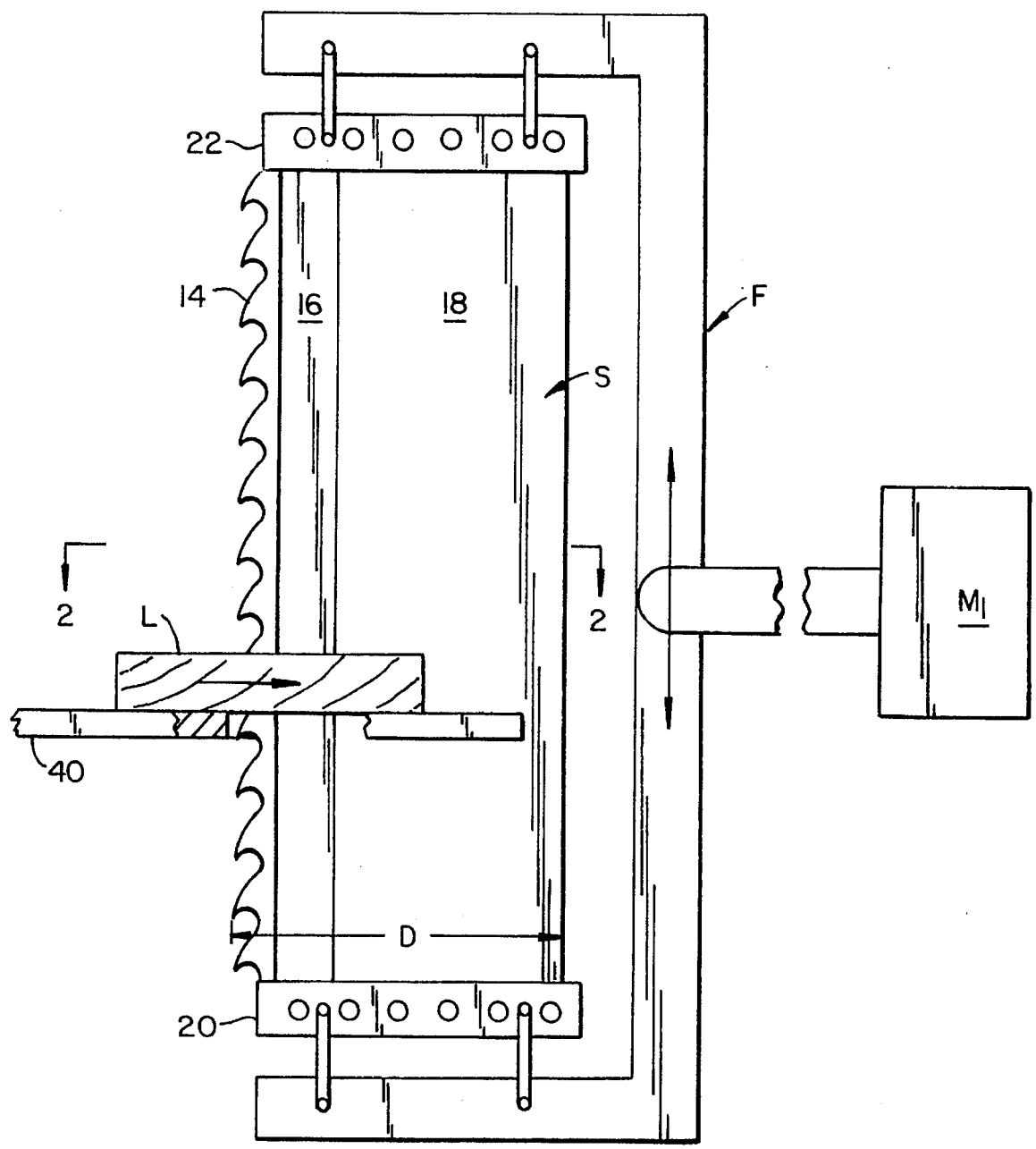
FIG. 1 is a side elevation of a saw segment according to this invention with the two longitudinally extending sections behind the supported teeth being shown.
Figure 2:
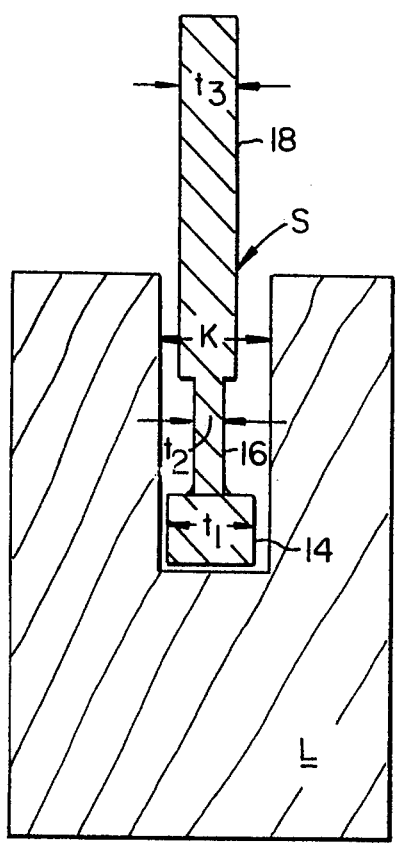
FIG. 2 is a section along line 2—2 of FIG. 1 with a piece of sawed lumber with its resultant kerf being shown relative to the variable thickness of the longitudinally extending sections.

Referring to FIGS. 1 and 2, linear saw S is illustrated. It includes cutting teeth 14, first thinner longitudinal backing strip 16 and second thicker longitudinal backing strip 18. In the section of FIG. 2, the variable thickness of the saw S can be seen and understood.

For example, teeth 14 have a thickness $t_1$ which constitute the widest dimension of saw S. This is because the entire saw must fit through the kerf K of lumber L being cut. (See FIG. 3)

First longitudinal backing strip 16 has the thinnest dimension $t_2$. This longitudinal backing strip supports teeth 14 at the leading edge and fastens to second backing strip 18. This first longitudinal backing strip occupies 20% or less of the total width of saw S.

Second longitudinal backing strip 18 has an intermediate thickness $t_3$. This strip forms the bulk of the saw backing and occupies at lease one-half (50% or more) of the total width of the saw. A preferred embodiment has backing strip 18 occupying about 80% of the width of the saw. In broken lines a prior art saw backing is illustrated having a thickness t.

Returning to FIG. 1, the remain portions of a linear saw S can be understood. Typically, saw S is maintained in a frame F. Frame F includes clamps 20, 22. In the usual case, these respective clamps exert a high degree of tension on saw S.

Taking the case of the short linear saw here displayed, frame F is typically vibrated with an up and down component. Typically teeth 14 cut in a first direction (here down) and do not cut in a second direction (here up). The reader will understand that it is not the purpose of this invention to explain the considerable intricacies of reciprocating linear saw mechanisms. For example, many of such saws do not have a simple up and down movement. While such complex movements may change the profile of the illustrated cutting teeth, they do not alter the theory or general construction of the saw backing as illustrated herein.

It will be understood that frame F is typically connected to a mechanism $M_1$ for causing at least up and down movement. Such movement is assumed with saw S at teeth 14 cutting lumber L. In such cutting, a path know as kerf K is cut through the lumber L. Because of the nature of the wood cut, saw S, and the mechanism driving the saw, it will be seen that kerf K can be less than, equal to, or exceed the total thickness of the teeth of saw S table 30.

Some typical dimensions will be helpful to the reader. Further, these dimensions can be compared to those of saws in the prior art. This comparison is best made with respect to the enlarged and schematically expanded section illustrated in FIG. 3.

In the example here, a 10 inch width saw is utilized. Vertical length between supports exceeds 4 feet. The supports may be either grips at the ends of the saw or guides (roller or pads) between which guides the vertical length extends. Longitudinal section 16 has a width—including teeth 14—of about 2 inches or 20% of the total width (10 inches including the teeth) of the saw. Longitudinal section 18 occupies the remainder of the width of the saw (here something less than 8 inches). It will be understood that longitudinal section 18 will occupy more than half (or over 50%) of the total width of the saw.

All saws have teeth 14. In the prior art, such teeth can be the wider than kerf K, the same width as the kerf K, or narrower than the kerf K (as happens to be shown in FIG. 3). This is a function of the wood, saw motion, and saw. Here kerf K has a dimension of 0.118 inches and $t_1$ is only slightly less than this dimension—say 0.116 inches.

Figure 3:
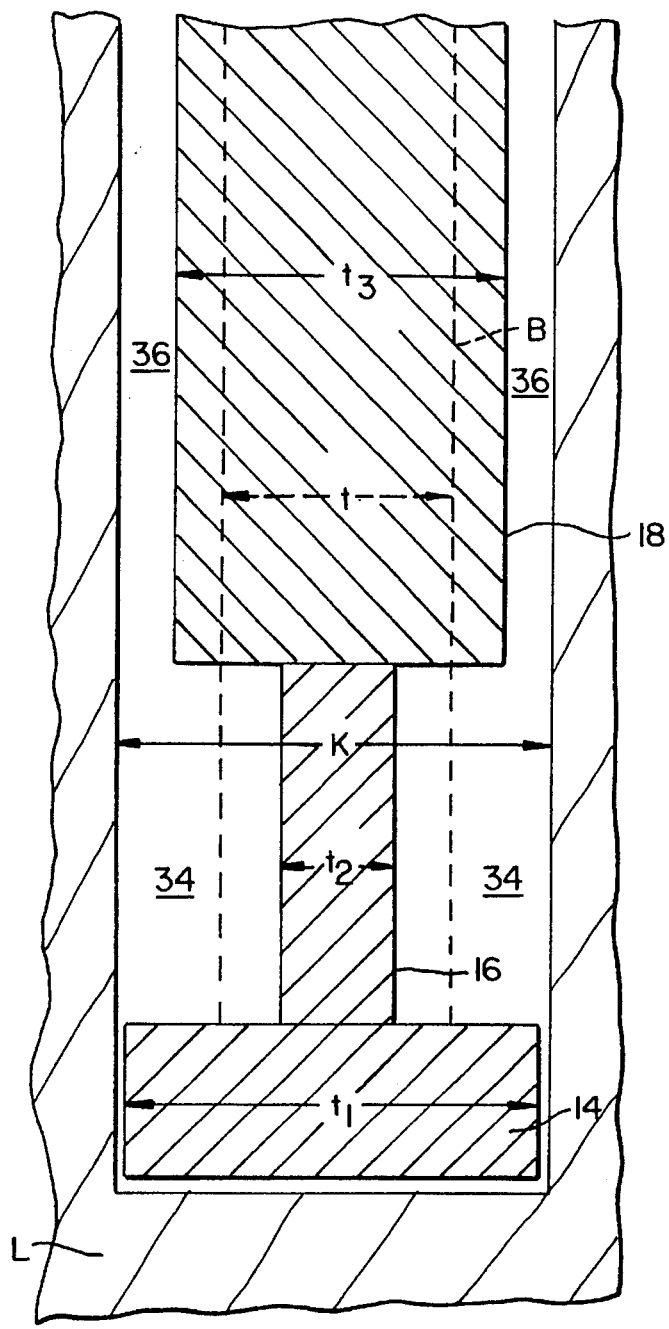
FIG. 3 is an expanded schematic section of a kerf showing the saw of this invention compared to a saw of the prior art and emphasizing the longitudinally thin and thicker sections relative to the kerf, the diagram illustrating contraction of width dimension adjacent the teeth and expansion of width dimension away from the teeth.

Referring to FIG. 3, a saw back B of the prior art is shown in broken lines. This backing B would be in the order of 0.060 inches.

For the embodiment of this invention, thickness $t_2$ and $t_3$ can vary. For example, in a relatively large 0.024 inch step $t_2$ can be 0.0425 inches with $t_3$ 0.0665 inches. In an intermediate 0.016 inch step, $t_2$ can be 0.048 inches and $t_3$ 0.064 inches. In a relatively narrow 0.008 inch step, $t_2$ can be 0.054 inches and $t_3$ 0.062 inches. The same steps may be as well added to saws having overall average thickness in the range of 0.040, or 0.050 inches.

Figure 7A:
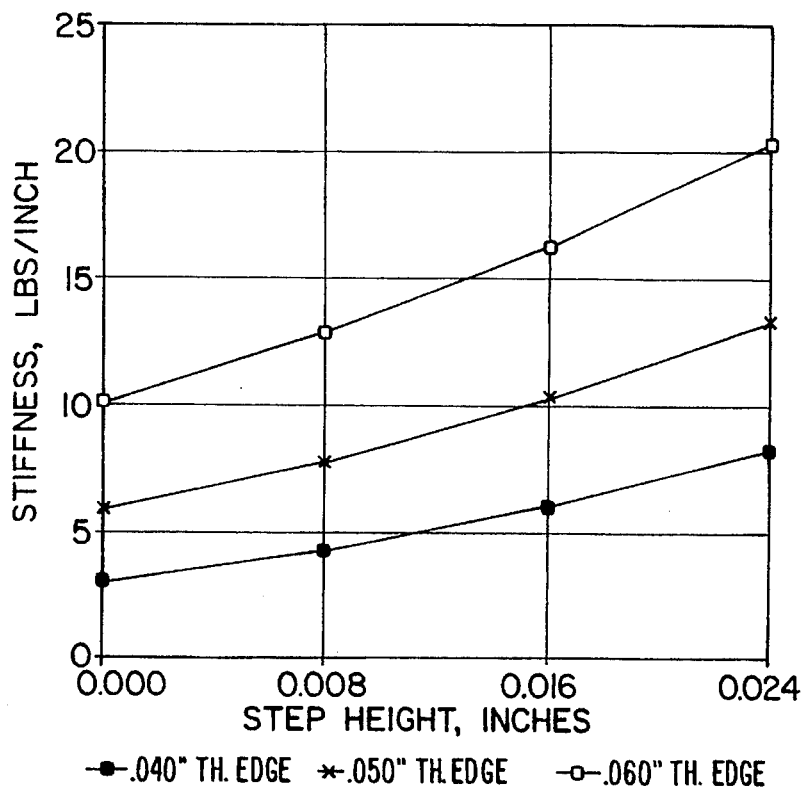
Figure 7B:
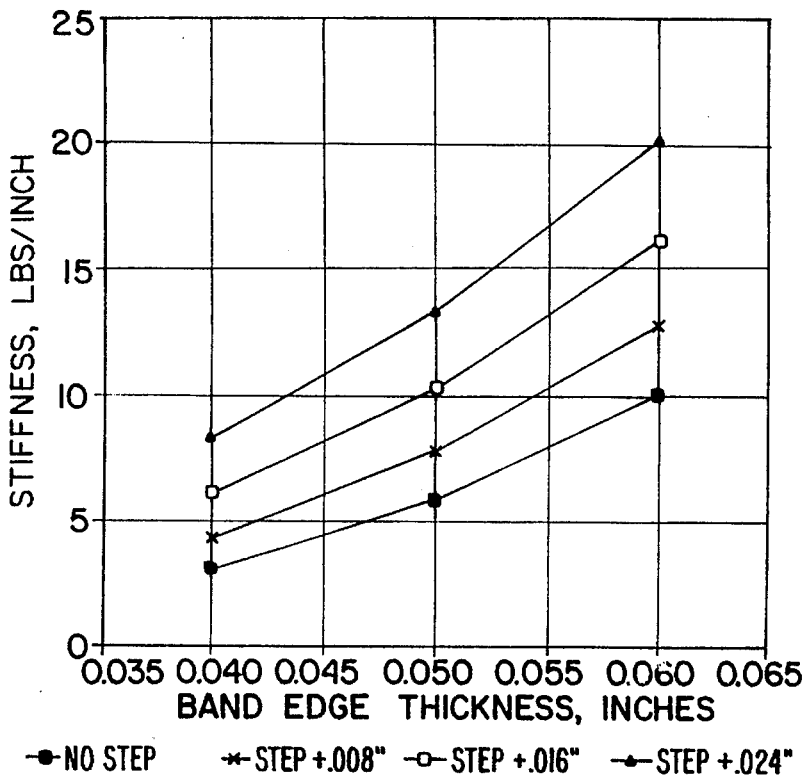

Referring to the graphs of FIGS. 7A and 7B, the comparison of the resistance to transverse deflection during the operation of the saw herein disclosed can be seen to be rather dramatic. In the graphic representations, a saw of the dimensions discussed above—10 inches overall width with a 1.5 inch narrow thickness longitudinal section—is plotted. For example, in FIG. 7A for a saw of 0.060 nominal thickness with a relatively large step of 0.024 inches ($t_2$ at 0.0425 inches; $t_1$ at 0.0665 inches), stiffness of the saw increases by a factor of two!

Referring to FIG. 7B, it can be seen that the greater the nominal thickness of the saw, the greater the stiffening effect of increased steps. Again, and by way of an isolated example, it can be seen that a relatively large step of 0.024 on a 0.060 nominal thickness saw again produces a doubling of the resistance to lateral deflection.

It will be seen that in both FIGS. 7A and 7B, deflections for other nominal thickness have been plotted.

Returning to FIG. 3, and remembering that the sawdust ejection problems associated with linear saws are usually more severe than those associated with circular saws, some discussion of the sawdust escape path in this linear design is in order.

Sawdust ejection from linear saws differs in at least two different respects. First, excess sawdust causes friction with resultant heating of the saw adjacent the cutting edge with resultant lowering of the transverse stiffness of the cutting edge. This is a result of heat expansion of the cutting edge which removes or offsets and counters at least some of the tension at the cutting edge. Second, excess sawdust can create lateral forces producing a deterioration of the kerf or rougher cut in the vicinity of the kerf.

Teeth 14 create sawdust during the sawing process. It is believed that the intervals 34 between thin longitudinal section 16 and the total kerf width K forms the required major path for the evacuation of the sawdust. The intervals 36 between thick longitudinal section 18 and kerf K are not substantially required for this purpose. Thus it is possible with the present construction to expand the width of thick longitudinal section 18 over the thickness of a conventional back B (shown in broken lines) of the prior art.

Figure 6:
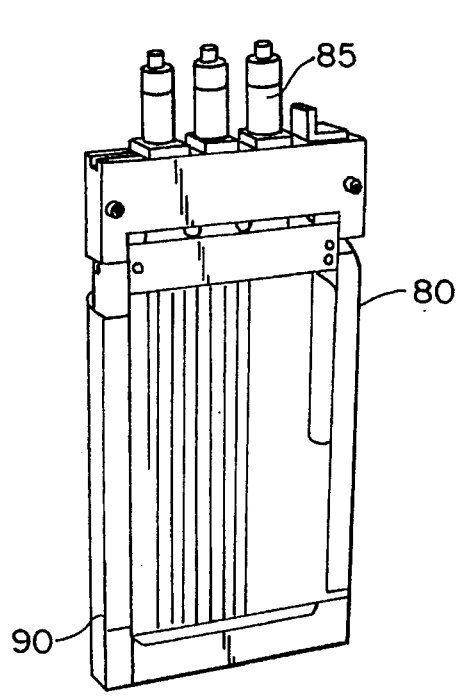

It will be understood by those having skill in the art, that reciprocating linear saws are frequently used in multiple saw configurations in which the saws are held in a common rectangular frame, the frame itself being reciprocated to achieve the desired cutting motion. Machines which embody this design are referred to as "frame saws" or "sash gang saws." Referring to FIG. 6, such gang configuration within a frame 80 is illustrated with having in excess of 10 saws 90 which can be more or less uniformly stressed by tensioning apparatus 85. It will be understood that the illustrated saws are of the design herein.

Since such gang saw apparatus is well known in the prior art, it will not be further discussed here other than to say that the saw of the present design finds excellent application in such an environment. Naturally, by moving the illustrated frame 80 into the apparatus of FIG. 1, sawing can theoretically occur. Again the reader will understand that such saw mechanism are extremely specialized; I chose to only schematically illustrate them here.

Figure 4:
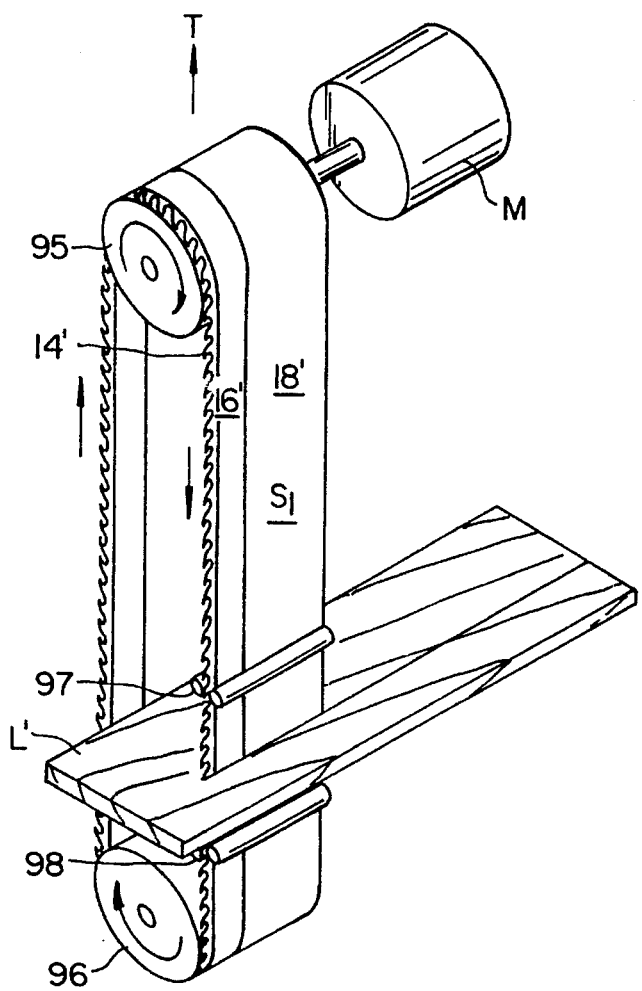
FIG. 4 is a schematic of a high strain band saw.

Referring to FIG. 4, endless band saw $S_1$ is schematically shown. Like saw S of FIG. 1, it includes teeth 14' narrow longitudinal section 16' and thick longitudinal section 18'. Two so-called wheels 95, 96 are shown with wheel 96 driven by motor M to produce the required cutting action. Lumber L' is shown being cut between guides 97, 98—which guides are well known. A transport system is generally utilized for the support of workpiece L (which may be a log, a piece of lumber, or some other material).

In modern so-called high strain band saws, tension is applied between the wheels to stress endless band saw $S_1$. The greater the tension, the greater the stiffness imparted to the saw, and the more linear the resulting cut.

Tension is considerable. By way of example, in a prior art saw having 8 inch width, and a uniform thickness in the range of 0.050 inches, 35,000 pounds tension would be an exemplary figure.

Figure 5:
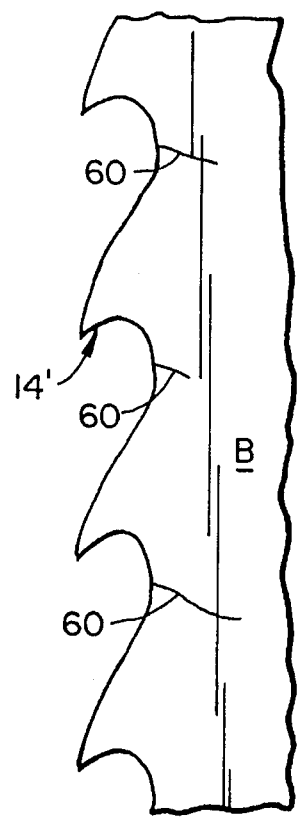
FIG. 5 is an illustration of the well known phenomenon of gullet cracking, which gullet cracking is inhibited by the linear saw construction set forth herein; and, FIG. 6 is a schematic representation of a thin cutting frame saw having a plurality of saws under tension mounted within a frame with the mechanism for causing the saw to move up and down being schematically shown; and, FIGS. 7A and 7B are graphic representations of the effects of the variable thickness on the ability of a linear saw having the form of a rectilinear plate to resist transverse forces, these graphic representations plotting point source deflecting forces at the cutting edge of the saw respectively against depth of step or thickness difference produced at thickness transition between various longitudinal segment thicknesses as well as deflection force resistance compared to change in longitudinal thickness variation.

Unfortunately, and in such endless band saws $S_1$, so-called gullet cracking can result. This is shown in FIG. 5.

Gullet cracking is at best a complex phenomenon and not completely understood. Suffice it to say that both as a consequence of the strain on the teeth during cutting of lumber L' and stress reversal occurring as endless band saw $S_1$ passes over respective wheels 95, 96, cracking can and does develop. Specifically, and as illustrated in FIG. 5, aggravated gullet cracking 60 appears between the teeth in the so-called gullet area.

Stresses produced by such gullet cracking can be theoretically predicted. Specifically, and using the techniques described in *Operating Stresses in Bandsaw Blades and Their Effect on Fatigue Life* by Hutton and Taylor, Forest Products Journal, Volume 41-July/August 1991-pages 12–20, I have calculated the effect of the dual thickness construction of this invention. Specifically for a band saw having a 1.5 inch longitudinal narrow zone 16' with a 6.5 inch thicker zone tension stresses can be increased. For example, where a uniform thickness bandsaw of 0.050 is provided with 0.024 step, tension can be increased 40% to about 50,000 pounds from the 35,000 pound tensile force utilized on saws of constant thickness. This result is believed surprising.

There can be an somewhat over simplified explanation for at least a part of this improved resistance. It should be understood, however, that this phenomenon is sufficiently complex that the following explanation is probably only partial.

Specifically, the portion 16' of the endless band saw $S_1$ adjacent teeth 14' is thinner. Stress reversal due to passage of the wheels 95, 96 is reduced as material becomes thinner. Therefore, gullet cracking may likewise be reduced.

It thus can be seen in the cases of endless bandsaw blades $S_1$, the tension placed on the saw is limited by the fatigue resistance of the saw. The proposed design increases this fatigue resistance. Thus, the design developed here will allow the use of thinner saws. Alternately, one can operate a variable thickness saw for longer periods of time before required change or reworking of the saw to avoid the effects of gullet cracking.

What is claimed is:

1. A linear saw of the type having:

cutting teeth having a first thickness for producing a kerf of a given width in sawing lumber;

a backing supporting the cutting teeth to define a total width of the linear saw, the backing having a maximum thickness less than the kerf produced by the cutting teeth;

the improvement to the backing comprising:

a first longitudinally extending segment of the backing supporting the cutting teeth having a thickness less than the maximum thickness of the backing, the first longitudinally extending segment of the saw backing occupying a width 20% or less than the total width of the linear saw; and a second longitudinally extending segment of the saw backing attached to and supporting the first longitudinally extending segment, said second segment having a thickness greater than the thickness of the first segment, the second longitudinally extending segment of the saw backing having a width occupying at least one-half of the total width of the linear saw backing.

2. The linear saw of claim 1 and wherein:

the linear saw has first and second ends; and, means for placing the linear saw under tension between the ends of the linear saw.

3. The linear saw of claim 1 and wherein:

the linear saw is a reciprocating saw having first and second ends.

4. The linear saw of claim 1 and wherein:

the linear saw is an endless band saw.

5. A linear saw having powered motion for cutting lumber of the type having:

the linear saw including;

cutting teeth having a first thickness for producing a kerf of given width in sawing lumber;

a backing supporting the cutting teeth to define a total width of the linear saw, the backing having a second thickness less than the kerf produced by the cutting teeth;

the powered saw further including;

means for applying tension on the backing parallel to the teeth;

means for moving the saw past lumber to be cut; and means for advancing lumber into the teeth of the saw for the lumber;

the improvement to the backing comprising:

a first and thinner longitudinally extending segment of the saw backing supporting the cutting teeth and having a third thickness less than the second thickness, the first and thinner longitudinally extending segment of the saw backing occupying a width 20% or less than the total width of the linear saw; and a second and thicker longitudinally extending segment of the saw backing attached to and supporting the first and thinner longitudinally extending segment, the second and thicker longitudinally extending segment of the saw backing having a width occupying at least one-half of the total width of the linear saw backing.

6. The linear saw having powered motion for cutting lumber according to claim 5 and wherein:

the saw is a frame saw.

7. The linear saw having powered motion for cutting lumber according to claim 5 and wherein:

the saw is a frame saw having a plurality of the blades.

8. The linear saw having powered motion for cutting lumber according to claim 5 and wherein:

the saw is a band saw.

\* \* \* \* \*